US006933019B2

(12) United States Patent
Mayer et al.

(10) Patent No.: US 6,933,019 B2
(45) Date of Patent: Aug. 23, 2005

(54) METHOD OF APPLYING A UNIFORM POLYMER COATING

(75) Inventors: Thomas Mayer, Santa Rosa, CA (US); Hiren V. Shah, Santa Rosa, CA (US); Brad A. Duffy, Santa Rosa, CA (US); Richard K. Zoborowski, San Diego, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 10/705,167

(22) Filed: Nov. 6, 2003

(65) Prior Publication Data

US 2005/0100667 A1 May 12, 2005

(51) Int. Cl.[7] .................................................. B05D 1/02

(52) U.S. Cl. .......................... 427/421; 427/58; 427/77; 427/78; 427/108; 427/110; 427/162; 427/163.1; 427/163.3; 427/163.4; 427/164; 427/165; 427/168
(58) Field of Search ............................. 427/58, 77, 78, 427/108, 110, 162, 163.1, 163.3, 163.4, 164–165, 427/168, 421

(56) References Cited

U.S. PATENT DOCUMENTS

| | | | |
|---|---|---|---|
| 1,877,350 A | 9/1932 | Meachem | |
| 2,023,710 A | 12/1935 | St. Onge | 299/63 |
| 2,880,940 A | 4/1959 | Briggs | 239/413 |

(Continued)

FOREIGN PATENT DOCUMENTS

| | | | |
|---|---|---|---|
| EP | 481548 A1 | 4/1992 | G03F 1/00 |
| EP | 0788876 A1 | 8/1997 | B32B 31/00 |
| JP | 59151135 | 8/1984 | G02F 1/133 |
| JP | 2000214317 | 8/2000 | G02B 5/20 |

OTHER PUBLICATIONS

H. L. Berger, *Ultrasonic Liquid Atomization Theory and Application*, Partridge Hill Publishers, New York, 1998, pp. 107-117.

K. Irie et al (Fujitsu), *A Color Enhanced PDP with Advanced Color Compensating Filter*, Proceedings of IDW'00 (Nov. 29-Dec. 1, 2000) pp. 1173-1176.

T. Okamura et al (Mitsui Chemicals, *PDP Optical Filter with Sputtered Multilayer Coatings and Organic Dyes*, Proceedings of IDW'00 (Nov. 29-Dec. 1, 2000) pp. 783-796.

*Primary Examiner*—Jennifer Kolb Michener
(74) *Attorney, Agent, or Firm*—Allen, Dyer, Doppelt, Milbrath & Gilchrist, P.A.

(57) ABSTRACT

A method of applying a polymer coating uses a nebulized aerosol of solubilized polymer solution having high-viscosity droplets and low-viscosity droplets to form a textured antireflective surface. Air or other gas is used to direct the nebulized aerosol toward the surface of an object. In some embodiments, heated or dried air, such as from an air curtain, is used to promote the formation of high-viscosity droplets. In a particular embodiment, multiple ultrasonic nebulizers are used in combination with synchronized air jets to apply a uniform polymer coating onto a glass panel used in a large-format display system. Dye is optionally added to the solubilized polymer solution to provide a notch filter at 585 nm and/or infrared filter.

9 Claims, 7 Drawing Sheets

U.S. PATENT DOCUMENTS

Figure 1A:
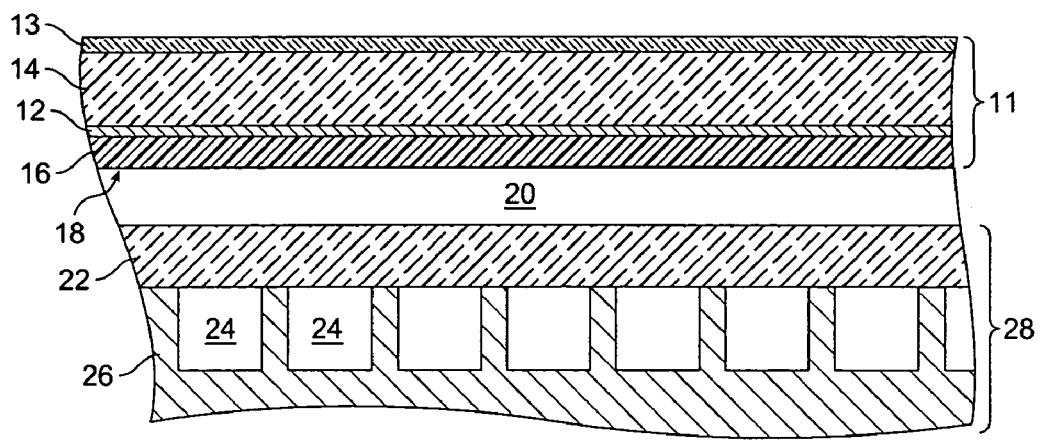

| | | | |
|---|---|---|---|
| 2,904,262 A | 9/1959 | Peeps | 239/408 |
| 3,455,507 A | 7/1969 | Ryder et al. | 239/215 |
| 3,601,532 A | 8/1971 | Bitzer et al. | 178/7.3 D |
| 3,670,961 A | 6/1972 | Tholome | 239/15 |
| 3,791,579 A | 2/1974 | Cowan | 239/3 |
| 4,181,756 A | 1/1980 | Fergason | 427/163 |
| 4,310,783 A | 1/1982 | Temple et al. | 313/474 |
| 4,655,393 A | 4/1987 | Berger | 239/102.1 |
| 4,850,534 A | 7/1989 | Takahashi et al. | 239/102.2 |
| 4,871,105 A | 10/1989 | Fisher et al. | 228/33 |
| 4,955,544 A | 9/1990 | Kopp | 239/304 |
| 5,064,119 A | 11/1991 | Mellette | 239/8 |
| 5,078,322 A | 1/1992 | Torntore | 239/289 |
| 5,079,214 A | 1/1992 | Long et al. | 503/227 |
| 5,219,120 A | 6/1993 | Ehrenberg et al. | 239/11 |
| 5,691,788 A | 11/1997 | Kim | 349/96 |
| 5,799,875 A | 9/1998 | Weinstein et al. | 239/296 |
| 5,811,919 A * | 9/1998 | Hoogsteen et al. | 313/422 |
| 5,818,168 A | 10/1998 | Ushifusa et al. | 313/582 |
| 5,952,137 A | 9/1999 | Ihara et al. | 430/27 |
| 6,165,546 A | 12/2000 | Teng et al. | 427/163.1 |
| 6,297,582 B1 | 10/2001 | Hirota et al. | 313/110 |
| 6,344,710 B2 | 2/2002 | Teng et al. | 313/479 |
| 6,471,782 B1 | 10/2002 | Fang et al. | 118/726 |
| 2003/0015692 A1 | 1/2003 | Teng et al. | 252/582 |

* cited by examiner

150

┌─────────────────────────────┐
│ FORM NEBULIZED AEROSOL FROM │―152
│ SOLUBILIZED POLYMER SOLUTION│
└─────────────────────────────┘
              ↓
┌─────────────────────────────┐
│    DIRECT AEROSOL TOWARD    │―154
│     SURFACE OF OBJECT       │
└─────────────────────────────┘
              ↓
┌─────────────────────────────┐
│  DRY TO FORM TRANSMISSIVE   │―156
│  POLYMER COATING WITH       │
│  ANTIREFLECTIVE SURFACE     │
└─────────────────────────────┘

*FIG. 10A*

160

┌─────────────────────────────┐
│     FORM FIRST NEBULIZED    │―162
│     AEROSOL FROM FIRST      │
│  SOLUBILIZED POLYMER SOLUTION│
└─────────────────────────────┘
              ↓
┌─────────────────────────────┐
│   DIRECT FIRST NEBULIZED    │―164
│  AEROSOL TOWARD SURFACE TO  │
│  FORM CONTINUOUS POLYMER FILM│
└─────────────────────────────┘
              ↓
┌─────────────────────────────┐
│    FORM SECOND NEBULIZED    │―166
│    AEROSOL FROM SECOND      │
│  SOLUBILIZED POLYMER SOLUTION│
└─────────────────────────────┘
              ↓
┌─────────────────────────────┐
│  DIRECT PARTICLES IN SECOND │―168
│  NEBULIZED AEROSOL TOWARD   │
│  CONTINUOUS POLYMER FILM TO │
│  FORM TEXTURED POLYMER FILM │
└─────────────────────────────┘
              ↓
┌─────────────────────────────┐
│   DRY TEXTURED POLYMER FILM │―170
└─────────────────────────────┘

*FIG. 10B*

METHOD OF APPLYING A UNIFORM POLYMER COATING

This U.S. Patent application is being concurrently filed with U.S. patent application Ser. No. 10/705,161 now pending, entitled DYED POLYMER COATING FOR DISPLAY PANEL, by Thomas Mayer, Hiren V. Shah, Brad A. Duffy, and Richard K. Zoborowski, the disclosure of which is hereby incorporated in its entirety for all purposes.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to depositing polymer coatings on a substrate, such as a glass panel, and more particularly to forming a nebulized aerosol from solubilized polymer solution and directing the nebulized aerosol toward the substrate to dry into a uniform polymer coating with an antireflective surface.

BACKGROUND OF THE INVENTION

The terms "spray painting", "spray coating", and "spraying" are used to refer to the formation of an aerosol by accelerating a liquid stream in a region where it experiences abrupt expansion. One way to achieve this expansion is to force a fluid through an orifice. The velocity of the fluid as it exits the orifice causes the fluid to break-up into droplets. Another method of forming an aerosol directs fluid onto a rotating disk. The fluid is accelerated to the speed of the disk as it moves to the outside of the disk. The velocity of the fluid as it leaves the disk causes the fluid to abruptly expand and break into droplets. These methods create fast-moving sprays traveling on the same vector as the originating fluid. Air jets are frequently positioned near the point where the droplets form to adjust the shape of the spray as it moves along the trajectory established by the original velocity vector.

Some particles traveling at high velocities tend to not wet a target surface. Instead, the droplets bounce off the target surface and are wasted or deposited elsewhere. The droplet deflected from a surface can move unpredictably to other areas of the target, causing variation in coating thickness and surface defects. The air jets associated with these types of spray processes can control the shape of the spray, but have little control over the direction of the droplets, which is established by the direction of the originating fluid. To spray coatings with a consistent thickness over a large area, the spray nozzles are mounted on mechanical systems. Some mechanical systems are programmed to move the spray nozzle(s) through a designated path to yield optimal coating thickness and consistency.

Spray aerosols are used in applications such as spray painting. However, using a spray aerosol to apply films to optical components, such as display panels, often results in a layer with a total thickness variation that undesirably degrades the performance of the optical component.

Examples of optical components that it is desirable to coat with a uniform polymer layer include various types of displays, such as cathode ray tubes, monochrome liquid crystal displays ("LCDs"), color LCDs, and plasma display panels ("PDPs"). Some display panels include color balancing, electric shielding, and/or contrast enhancing features. For example, in a PDP inert gases, such as helium, neon, argon, xenon and mixtures thereof are sealed in a glass envelope (e.g. between two glass panels). A high voltage is applied to selected areas of the display to locally form plasma, which emits light. PDPs, which are also known as gas display panels, have desirable features, such as a wide viewing angle, a slim form, and are active (i.e. light emitting) displays. PDPs are increasingly used in high-quality television sets, including large-format television sets. The advances in PDPs in general are promoting their use in other applications.

Unfortunately, neon, which is often used in the gas mixture for PDPs, produces orange-red light at 585 nm, which can cause an imbalance in the color of the display and reduce contrast unless corrective measures are taken. One technique that has been used balance the color from neon-containing PDPs is to incorporate a notch filter to absorb light around 585 nm. Filters for removing excess light at 585 nm, which also enhance contrast, have been incorporated in PDPs in a number of ways. Techniques include mixing a 585 nm absorbing dye into the adhesive used to laminate elements in the PDP assembly and of applying a polyester film with an appropriate dye to a PDP assembly.

One or more films can be formed from a mixture of dye or dyes in a polymer matrix by any of several suitable techniques, such as solvent casting, extrusion, spray coating, roller coating, dip coating, brush coating and spin coating. However, some of these techniques do not result in a uniform thickness of the dyed layer, resulting in poor optical performance. Thickness variation is particularly difficult to control on large-format substrates, such as are used in television sets. Other techniques, such as laminating a dyed polymer film to a PDP assembly, are expensive and require extra handling and parts. It is desirable to provide methods of applying uniform polymer coatings to glass panels and similar objects, particularly large-format objects. It is further desirable to include a dye or dyes to provide a polymer coating with optical filtering properties. It is yet further desirable to provide polymer coatings with antireflective surfaces.

BRIEF SUMMARY OF THE INVENTION

An embodiment of the present invention enables applying a transmissive polymer coating having a textured antireflective surface to an object, such as a glass panel. A nebulized aerosol is formed from a solubilized polymer solution and directed toward a surface of the object to wet the surface. The solubilized polymer solution is dried to form the transmissive polymer coating having the textured antireflective surface. In one embodiment a polymer coating is differentially dried to result in a wrinkled surface. In another embodiment, particles are added to the solubilized polymer solution or onto the polymer coating to provide an antireflective textured surface. In yet another embodiment, high-viscosity and low-viscosity droplets from a nebulized aerosol are deposited on the object. At least portions of some of the high-viscosity droplets extend above an essentially continuous polymer film.

In another embodiment, a first portion of the nebulized aerosol is formed from a first nebulizer and a second portion of the nebulized aerosol is formed from a second nebulizer. The air jets and/or nebulizers are synchronously oscillated to direct the first and second portions of the nebulized aerosol toward the surface. In a particular embodiment, the surface of the object is moved along under the nebulizers and the first air jet and the second air jet distribute the nebulized aerosol transverse to the direction of travel of the surface, wherein the surface has a transverse dimension of at least 18 inches and the transmissive polymer coating has a total thickness variation of not more than 5%.

Embodiments include mixing a dye or dyes into to solubilized polymer solution. A dye for providing a notch filter at 585 nm or other wavelength is provided in some embodiments. In further or alternative embodiments, another dye or dyes is added to filter infrared and/or ultraviolet light. The notch filters provide improved color balance and contrast. Dye is generally added to the solubilized polymer solution in a sufficiently low concentration to avoid phase separation in the resultant dried polymer coating.

In an alternative embodiment, two nebulized aerosols are formed, one from a first nozzle and another from a second nozzle. The nebulized aerosols optionally have different characteristics, such as viscosity. A continuous polymer film is formed from the first nebulized aerosol, and droplets from the second nebulized aerosol are directed toward the continuous polymer film so that particles in the second nebulized aerosol adhere to the continuous polymer film and at least partially extend above the continuous polymer film to form a textured polymer film.

BRIEF DESCRIPTION OF THE DRAWINGS

FIG. 1A is a simplified cross section of a PDP according to an embodiment of the present invention.

FIG. 1B is a simplified cross section of a glass panel for use in a display system according to an embodiment of the present invention.

FIGS. 2A–2C are simplified cross sections showing two low-viscosity drops flowing out to form a continuous film on a surface of a substrate.

FIGS. 3A–3C are simplified cross sections showing the interaction of a high-viscosity drop in a film formed from low-viscosity drops.

FIGS. 4A–4C are simplified cross sections showing the continued addition of low-viscosity drops to the film of FIG. 3C.

FIGS. 5A–5C are simplified cross sections showing the continued addition of a low-viscosity drop to the film of FIG. 4C.

FIGS. 6A–6C show relative coating thickness versus position on a substrate for different spray head configurations.

FIGS. 7A and 7B are simplified top view diagrams of a spray head according to embodiments of the present invention.

FIGS. 8A–8D are front views of a spray head according to embodiments of the present invention.

FIG. 9 is a simplified front view of the spray head shown in FIGS. 8A–8D.

FIG. 10A is a flow chart of a method according to an embodiment of the present invention.

FIG. 10B is a flow chart of a method using two nebulized aerosols according to another embodiment of the present invention.

DETAILED DESCRIPTION OF THE INVENTION

I. Introduction

A substrate or other object is coated with a polymer solution to obtain an antireflective surface. In a further embodiment, the polymer solution contains a dye to form a dyed polymer coating that functions as an optical filter. As used herein, "dyed polymer" means a solution, including a solid state solution, of dye in a polymer matrix. It is generally desirable to keep the concentration of dye sufficiently low to avoid phase separation of the dye from the polymer. The dyed polymer coating provides improved safety, durability, environmental, and optical performance. In one embodiment, the dyed polymer coating is sandwiched between an EMF filter and the light-emitting portion of a PDP. This configuration protects the dyed polymer coating, which in one embodiment is a notch filter for 585 nm light, from scratches. The dyed polymer coating also serves as a barrier to protect the EMF filter from environmental degradation. The dyed polymer film also acts as a safety film to retard the formation of loose glass shards if a glass substrate shatters. In a further embodiment, thin-film layers forming the EMF filter are chosen to minimize reflection between the dyed polymer film notch filter and the EMF filter, which optimizes the light throughput of the PDP and suppresses halo formation on the face of the screen.

I. An Exemplary PDP and Glass Panel

FIG. 1A is a simplified cross section of a PDP 11 according to an embodiment of the present invention. An EMF filter 12 is formed on a substrate 14, such as a panel of glass or plastic, and a dyed polymer coating 16 is formed on the EMF filter 12. The EMF filter 12 is a layer(s) of transparent conductor, such as indium-tin oxide, or a semi-transparent or essentially transparent thin layer(s) of metal, such as silver. The dyed polymer coating 16 absorbs light in the region of 585 nm to enhance contrast and includes a surface 18 that reduces reflections between the dyed polymer coating 16 and a gas space 20. The gas space is filled with air or other gas or mixture of gases, and may optionally be partially evacuated. The dyed polymer coating is applied to the substrate 14, and the term "polymer coating" means that the coating is formed on the substrate, and not applied to the substrate as a pre-formed film or sheet using adhesive or heat bonding. The EMF filter 12 may occupy a different position in the PDP, but some EMFs are quite susceptible to environmental degradation, such as from moisture and/or oxidation, and coating the EMF filter with liquid dyed polymer enhances the environmental stability of the EMF filter and protects the EMF filter from scratches during handling and assembly. Other structures, such as an antireflective ("AR") layer 13 and/or infrared ("IR") filter (not shown) are optionally included in the PDP.

The gas space 20 separates a glass sheet 22 from the dyed polymer coating 16. Plasma cells 24 are formed in a substrate 26, which is attached to the glass sheet 22. The illustration of the glass sheet 22, plasma cells 24, and substrate 26, which together make up a "plasma panel" 28, is highly simplified for purposes of discussion. There are many structures and configurations of plasma panels known to those of skill in the art. The gas space 20 is typically sealed between the plasma panel 28 and the PDP 11 by a perimeter seal (not shown); however, the perimeter seal might not be an air-tight seal, or might degrade, and overcoating the EMF enhances environmental durability of the EMF.

In one embodiment, the surface 18 of the dyed polymer coating 16 is textured to reduce reflections between the gas space 20 and the dyed polymer coating 16. The texture is random or alternatively repeating, and in one embodiment a random texture is formed by controlling the distribution of droplet viscosity in a spray used to apply the dyed polymer coating to result in an antireflective surface. In another embodiment, an antireflective textured surface pattern is formed by drying a solvent-based polymer coating in such a way as to induce differential shrinkage of the surface of the polymer coating. In yet another embodiment, a dyed polymer coating is embossed to create an antireflective surface, either when the polymer coating is still at least partially wet, or when it is dry. In an alternative embodiment, an antireflective surface is formed on an undyed polymer coating.

The surface 18 of the dyed polymer coating 16 is antireflective if the reflectivity of the surface 18 is less than the reflectivity calculated below:

$$\text{Reflectivity} = \left[\frac{n_2 - n_1}{n_2 + n_1}\right]^2 \quad \text{Equation 1}$$

The reflectivity of light from a surface depends upon the angle of incidence and upon the plane of polarization of the light. The general expression for reflectivity is derivable from Fresnel's Equations. For the purpose of calculating the reflection from an optical surface it is sufficient to have the reflectivity at normal incidence. This normal incidence reflectivity is dependent upon the indices of refraction of the two media. The first surface reflectivity is antireflective if the measured first surface reflectivity is less than the reflectivity calculated by Equation 1, where $n_2$ is the index of refraction for the dyed polymer coating and $n_1$ is the index of refraction for the gas between the active elements of the plasma light source and the dyed polymer coating. In one embodiment, an antireflective surface of the dyed polymer coating is formed by embossing the partially cured or fully-cured surface of the polymer coating with a roller or form containing a selected pattern. The selected pattern generally consists of repetitive, pseudo-random, or random features, such as size and distribution, as to render the outer surface of the dyed polymer coating antireflective.

In another embodiment, an antireflective surface of the dyed polymer coating is formed when liquid polymer is applied to the EMF filter in a low-velocity nebulized aerosol process. Differential shrinkage induces random features of such a size as to render the outer surface of the dyed polymer coating antireflective. Drying a solvent-based dyed polymer is controlled to cause the top surface of the coating to dry at a faster rate than the bulk of the coating. During the drying process the top surface of the coating becomes highly viscous and then solid. Solvent is lost during the process, causing a loss in volume in the surface of the coating as a surface film forms. This surface film forms wrinkles as it shrinks and slides over the relatively lower viscosity portion of the polymer coating it floats on. This process causes the surface of the polymer coating to form reticulations. Drying conditions are selected to achieve a desired size and level of reticulation that have antireflective properties.

Other PDPs use a polymer film layer attached to a glass sheet with an adhesive to achieve a contrast-enhancing filter. In some instances, the adhesive contains dye that filters out undesired 585 nm light. However, these techniques do not lend themselves to providing an antireflective surface between the gas space and the PDP. For example, many display panels use polyester film, such as polyethylene terephthalate ("PET") or polybutylene terephthalate ("PBT"), secured to the PDP with an adhesive layer. While it is possible to deposit a thin-film AR coating on the polyester film, crazing damage often occurs, and the AR coating might crack or delaminate during subsequent handling, such as when the polyester film is applied to the glass panel. Another approach uses an index-matching layer, such as a thin layer of polytetrafluoroethylene ("PTFE"), commonly called "TEFLON", on a film of PET. The PTFE has an index of refraction of 1.35, which is between the index of refraction for PET (about 1.6) and the index of refraction of the gas space. Polyester films, which are typically made by a drawing process, are difficult to emboss because embossing distorts the film.

Figure 1B:
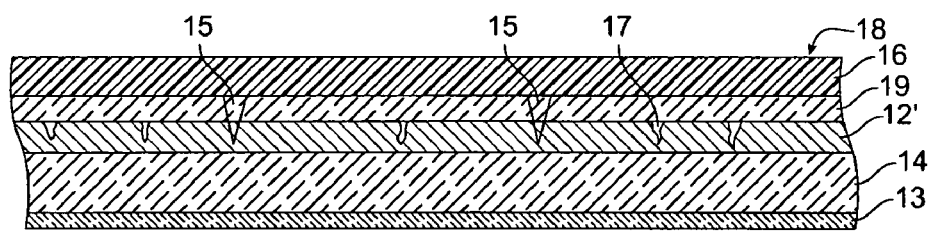

FIG. 1B is a simplified cross section of a PDP panel 11' according to another embodiment of the present invention. A stack of thin-film layers 12' is deposited on the glass substrate 14. The stack of thin-film layers 12' includes one or more conductive layers susceptible to moisture-induced corrosion. In a particular embodiment, the stack of thin-film layers is commonly known as a low-emissivity ("low-E") coating. An example of a moisture-sensitive conductive layer used in low-E coatings is a semi-transparent thin film of silver, for example. Low-E coatings often have several silver thin-film layers electrically connected at an edge of the panel.

Nodules 15 can grow in the thin-film stack 12' due to defects on the surface of the glass substrate 14, or from defects that arise during the coating process, such as from particulate contamination. Nodules 15 typically propagate through successive thin-film layers, increasing in diameter as they grow. Nodules that are removed from the low-E coating leave a void 17. Moisture can propagate along the margin of the nodule or through the void to induce corrosion in the thin-film stack 12', particularly in thin-film layers of silver or other metal(s).

A thin-film barrier overcoat 19 is deposited over the first thin-film stack 12'. The barrier overcoat 19 matches the index of refraction of the first thin-film stack 12 to the index of refraction of the dyed polymer coating 16, thus improving the transmission characteristics of the PDP 11'. In a preferred embodiment, the nodules are purposefully removed from the thin-film stack 12' by brushing or washing. In a further embodiment, the thin-film stack 12' is tempered, which causes compressive stresses in the stack and facilitates nodule removal. Voids 17 formed by the removal of nodules are sealed by the index-matching barrier overcoat 19. It is believed that in some embodiments nodules propagate through the index-matching barrier layer and are adequately sealed by the dyed polymer coating 16 for use in some applications. The surface 18 of the dyed polymer coating 16 is optionally patterned to reduce reflections. Nodule removal and sealing of voids is further discussed in co-pending, co-owned U.S. patent application Ser. No. 09/990,195 entitled GLASS PANEL WITH BARRIER COATING AND RELATED METHODS, filed Nov. 21, 2001 by Brad A. Duffy and Robert W. Adair, the disclosure of which is hereby incorporated by reference in its entirety for all purposes.

II. Exemplary Coating Processes

Figure 2A:
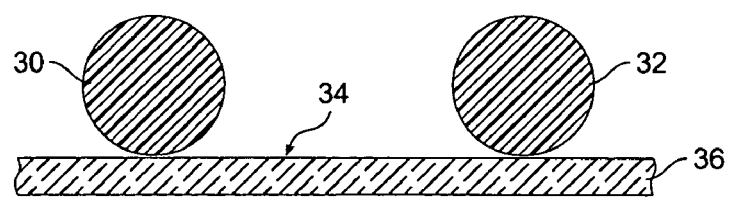
Figure 2B:
Figure 2C:
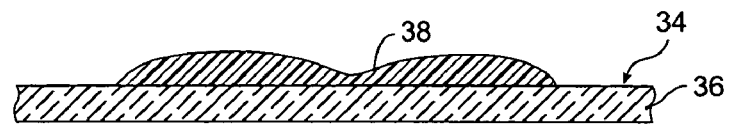

In one embodiment, an air-directed low-velocity nebulized aerosol coating process forms a random antireflection textured pattern on the surface of a polymer coating. The air-directed low-velocity nebulized aerosol coating process includes forming an aerosol of liquid that contains droplets, and guiding those droplets onto the surface of a substrate. FIGS. 2A–2C are simplified cross sections showing two low-viscosity drops flowing out to form a continuous film on a surface of a substrate. Once deposited, the droplets flow together to form a continuous film. Air or other gas(es) is used to direct and control the droplets.

Solvent-based droplets lose solvent before they are deposited on the substrate. Typical spray coating processes are optimized to deliver the spray droplets to the target (substrate) while retaining the maximum amount of solvent possible in the droplets. The more solvent contained in a droplet, the lower the viscosity of the droplet when it contacts the substrate surface. The lower the viscosity of the droplets, the faster they spread and form a continuous film. Spray coating processes are typically optimized to deliver the spray droplets to create a smooth, high-gloss coating. We have found that a random antireflection surface texture can be induced in a polymer coating by controlling the viscosity distribution and size(s) of droplets in a nebulized aerosol.

Adjusting the rate at which drops spread on a surface can be used to control the surface texture of the final deposited film. Higher viscosity drops do not spread out as fast as lower viscosity drops. As a result, a film formed from drops of different viscosities will have a surface texture.

Nebulized plumes ("clouds") of solvent-based fluid media typically have a distribution of droplets that vary in viscosity. The distribution of droplet viscosity can be selected by controlling spray parameters, such as initial solvent concentration, solvent type, temperature, droplet size, and droplet size distribution. In some embodiments, the droplets near the edge of the plume lose solvent faster than droplets in the middle of the plume, where the partial pressure of solvent is higher. The droplets nearer the edge generally have a higher viscosity when they land on the substrate. Similarly, a small droplet will proportionally lose solvent faster than a large droplet because the surface-to-volume ratio is higher.

In typical spay coating operations, such as decorative spray painting, it is generally desirable to have the spray coating flow out to a smooth, uniform surface. When using solvent-based paint media, such as automotive lacquer or enamel, the solvent redistributes somewhat between the droplets after they land on the surface because the organic solvents are used that resolubilize the higher-viscosity droplets. In other words, the increase in droplet viscosity in the plume is somewhat reversible and can be lowered after the high-viscosity droplet lands on, or is covered by, lower-viscosity droplets, facilitating leveling and smoothing.

It was discovered that spray media that does not resolubilize can be used to form an antireflective surface on a spray-coated polymer film layer. For example, a water-based urethane spray medium is used to form a urethane coating with an antireflective surface. As droplets of the spray medium lose water, which is the solvent in this system, the concentration of polymer increases and in some cases the dispersed polymer molecules coalesce within the droplet. When this occurs it is largely non-reversible. Therefore, when a high-viscosity droplet lands on, or is covered by, lower viscosity droplets, the viscosity of the high-viscosity droplet is essentially maintained. A number of different options were tried besides water-based polyurethane, including polymers soluble in organic solvent and two-component reactive systems (both thermal and UV). Other polymer systems are used in alternative embodiments; however, water-based polyurethane is particularly desirable because of the good adhesion of the resultant layer to glass, low volatile organic compound (VOC), and excellent film quality (i.e. mechanical strength and clarity). In a particular embodiment, a water-based polyurethane system includes about 10% organic solvents ("co-solvents") and modifiers in the liquid. When coatings formed of droplets that did not substantially resolubilize were applied to a surface of a glass panel using a spray process according to an embodiment of the present invention, a polymer layer with an antireflective surface was obtained. The polymer layer optionally includes a dye or dyes to provide optical filtering.

FIG. 2A shows a first drop 30 and a second drop 32 of a solvent-based polymer material on a surface 34 of a substrate 36, such as an essentially clear glass or plastic panel. The panel optionally includes EMF, NIR, AR, polarizing or other optical filters. FIG. 2B shows the first drop 30 and the second drop 32 spreading across the surface 34 of the substrate 36. FIG. 2C shows an essentially continuous polymer film 38 formed from the first and second drops on the surface 34 of the substrate 36. In a particular embodiment, both droplets are essentially the same polymer with different amounts (concentration) of solvent.

Figure 3A:
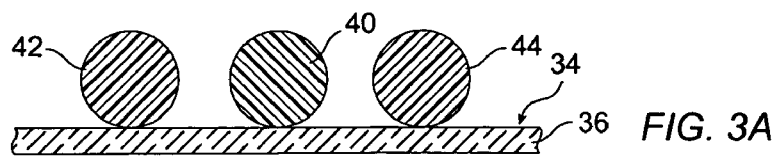
Figure 3B:
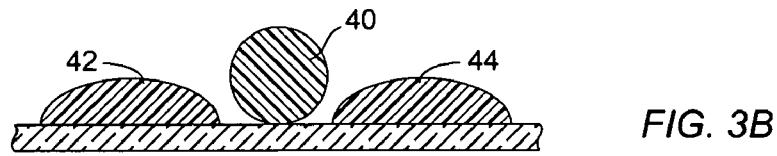
Figure 3C:
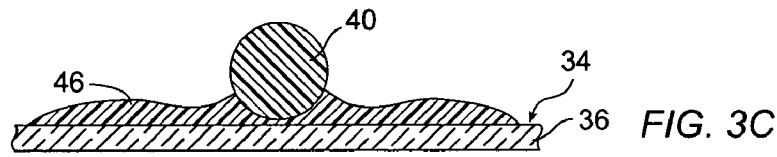

FIGS. 3A–3C are simplified cross sections showing the interaction of a high-viscosity drop 40 in a film formed from low-viscosity drops 42, 44. In one embodiment, the high-viscosity drop is formed from the same solubilized polymer solution as the low-viscosity drops, but has lost more solvent during the spray-coating process. In some embodiments, solvent concentration in the solubilized polymer solution controls droplet size, and the humidity and/or height of the nozzle (drying conditions) controls the viscosity of the droplets as they land on the surface. Using the same type of solubilized polymer solution to form the high- and low-viscosity droplets results, after drying, in a material with an essentially homogeneous refractive index and a polymer layer that provides good optical performance. Alternatively, solid particles are added into the solubilized polymer solution. Both the size and refractive index of the solid particles are adjusted to control the final optical performance of the coating.

FIG. 3A shows the high-viscosity drop 40 and two low-viscosity drops 42, 44 on the surface 34 of a substrate 36. FIG. 3B shows how the high-viscosity drop 40 tends to hold its shape while the low-viscosity drops 42, 44 flow across the surface 34 of the substrate 36. It is understood that the depiction of the high-viscosity drop 40 is simplified, and that some amount of flow and/or shrinkage typically occurs after the high-viscosity drop lands on the surface, but generally a portion of the high-viscosity drop protrudes (extends) above the film formed from the low-viscosity drops to provide a textured antireflective surface. FIG. 3C shows an essentially continuous polymer film 46 formed from the two low-viscosity drops with a portion of the high-viscosity drop 40 extending above the continuous polymer film 46.

Figure 4A:
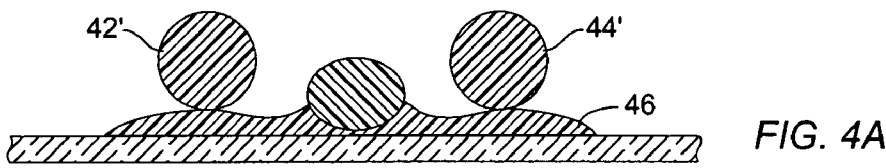
Figure 4B:
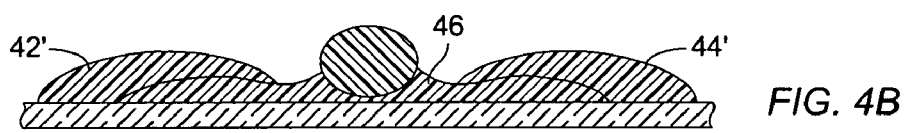
Figure 4C:
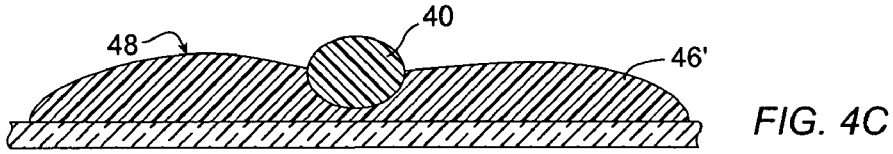

FIGS. 4A–4C are simplified cross sections showing the continued addition of low-viscosity drops to the film of FIG. 3C. FIG. 4A shows additional low-viscosity drops 42', 44' added to the continuous polymer film 46 of FIG. 3C. The low-viscosity drops 42', 44' are the same as the originally deposited low-viscosity drops (see FIG. 3A, ref. Nums. 42, 44), or have the same type of solvent-based polymer and a different type or amount of solvent, or have a different type of solvent-based polymer solution. In a particular embodiment, the low-viscosity drops are made from the same solubilized polymer solution and solvent as the high-viscosity drops. In another embodiment, both low-viscosity droplets and high-viscosity droplets are formed from a spray medium dispensed from a nozzle, the spray medium forming a cloud of droplets, some of which lose relatively more solvent to develop into high-viscosity droplets.

FIG. 4B shows how the low-viscosity drops 42' 44' spread across the original continuous polymer film 46, and FIG. 4C shows how the low-viscosity drops are incorporated into a thicker continuous polymer film 46'. The height that the high-viscosity drop 40 rises above a surface 48 of the polymer film 46 is reduced as the thickness of the film increases, thus in some embodiments the feature size related to the high-viscosity drop in a final film depends on both the size of the initial drop and the final thickness of the polymer.

Additional application of droplets to the continuous polymer film enables several advantages. While the concentration of dye in the solubilized polymer solution should be below the point where the dye phase separates from the polymer as the polymer coating dries, the solid state concentration of dye can be reduced in thicker coatings to achieve the same optical filtering. Increasing the thickness of the polymer coating also increases the safety of the PDP by retaining more glass shards if the glass panel breaks. The thickness of the layer is increased by multiple applications of polymer solution, allowing the polymer coating to at least partially dry before subsequent coats of polymer solution are applied. In a particular embodiment, dyed polymer solution is applied and allowed to dry, and then a clear coat of solution based on the same polymer is applied over the dyed polymer layer. The coating parameters are selected so that the clear coat forms an anti-reflective layer. In one embodiment, the dyed polymer is applied under different coating parameters than the clear polymer to obtain an even coating of the dyed layer.

Figure 5A:
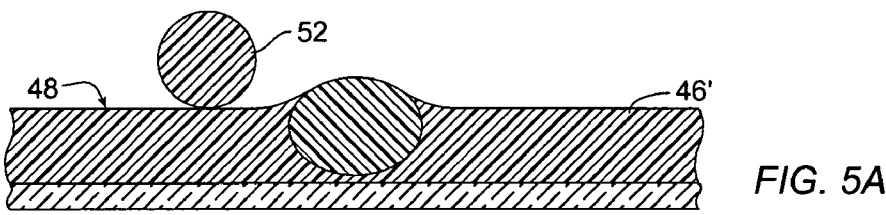
Figure 5B:
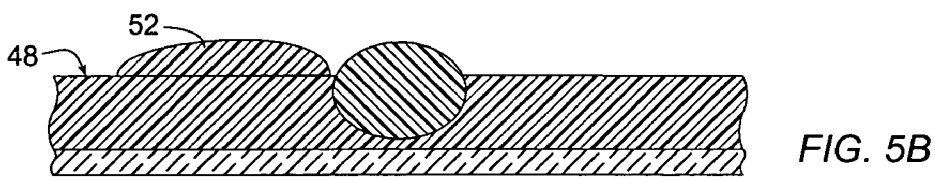
Figure 5C:
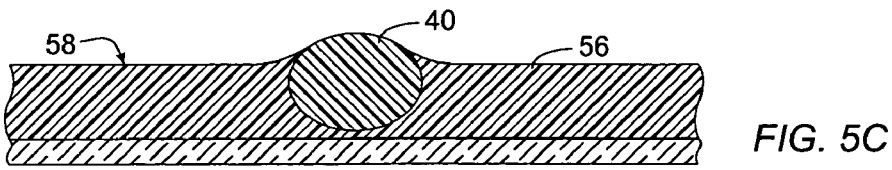

FIGS. 5A–5C are simplified cross sections showing the continued addition of a low-viscosity drop 52 to the polymer film 46' of FIG. 4C. FIG. 5A shows the low-viscosity drop 52 about to land on the surface 48 of the polymer film 46' of FIG. 4C. FIG. 5B shows the low-viscosity drop 52 spreading out across the surface 48. FIG. 5C shows a thicker dyed polymer film 56, with a higher surface 58. The height that the high-viscosity drop 40 rises above the surface 58 is further reduced. A typical thickness of the dyed polymer film 56 is about 35 microns, but the dried thickness of a dyed polymer coating can range between about 2 microns to about 200 microns.

Initial viscosity of the spray media is typically between 1 centipoise ("cps") and 200 cps, and more preferably between 50–70 cps, depending on the types of precursor and solvents used. Generally, the higher the viscosity of the spray media, the greater the effect the droplets have on the resultant surface of the coating. Irregularities in the surface of the substrate cause the wet film layer formed from low-viscosity drops to collect at points on the surface of the substrate. These collection points can be reduced by pre-coating the substrate with a wet polymer layer and subsequent drying. The thickness of the applied (wet) film should be between about 5 microns and about 250 microns to avoid collection of the applied film at these points. Exposing the coated substrate to temperatures between 30° C. and 170° C. for between 1 second and 90 seconds after the wet coating has been applied to the substrate further avoids localized collection of the wet film layer, depending on the type of material being deposited.

III. Exemplary Deposition Processes

Ultrasonic sprayers, which allow a higher level of deposition control and lower variation in coating thickness compared to abrupt expansion spray techniques, are used to create low-velocity nebulized aerosols. Air jets and air curtains are used to direct the nebulized aerosol to deposit polymer on a substrate.

Several ultrasonically nebulized aerosols may be combined to deposit polymer coatings on large panels. In one embodiment, the velocity vector of a nebulized aerosol is directed so that it interacts with an air curtain before the aerosol droplets contact the substrate. In a further embodiment, air jets are added to direct the nebulized aerosol to an air curtain to increase the area of the nebulized aerosol. The nature of the nebulized aerosol allows it to be directed up or down toward a substrate. In one embodiment, the air jets are independently controllable regarding air pressure (velocity and mass) and oscillate in a synchronized fashion to direct the nebulized aerosol at a substrate, such as a glass or plastic panel, with low-pressure, low-flow air or other gas. Oscillating the spray heads (which in this instance includes both the spray nozzle and air jets) directs the nebulized aerosols over a larger area and is particularly desirable for coating large substrates, which are typically advanced under the spray heads. In a particular instance, two oscillating spray heads, each producing a nebulized aerosol cloud about three inches wide, coated a substrate about forty-six inches wide. In an alternative embodiment, just the air jets oscillate. In another embodiment, a spray head or heads reciprocates across the substrate as it advances under the spray head(s).

Alternatively, a glass substrate is coated with solubilized polymer solution and allowed to partially dry. The coated glass substrate is embossed with a pattern on an embossing roller. Typically, a backing roller is used on the opposite side of the glass substrate to support it as the coated side of the glass substrate is embossed. The pattern on the embossing roller is pressed into the soft, partially dry polymer coating. The surface of the polymer coating is typically drier than the underlying polymer, which is much softer and impressionable than the surface film ("crust"); however, the surface film is pliable and the polymer layer is embossed with an AR pattern.

In some cases, the panel is not flat and may include ridges. It is desirable to maintain a coating thickness within ±2.5% over the entire viewing surface of the panel (i.e. a total thickness variation, or "runout" of not more than 5%) to avoid uneven color balancing and/or contrast enhancement. Conventional techniques are not suitable to coat large-area (e.g. greater than 24×24 inches) and/or non-flat (e.g. ridged or curved) substrates maintaining thickness variation to less than 5% over the viewing surface. Glass panels coated using methods according to embodiments of the present invention achieved 1.7% total thickness variation across a flat, smooth glass panel approximately 61 cm×102 cm (24 in.×40 in.). The consistent thickness of this sample provided a variation in transmission through the coated glass panel of about ±1.33%, which is generally undetectable by the unaided human eye and suitable for use in high-quality color displays, such as PDPs.

Figure 6A:
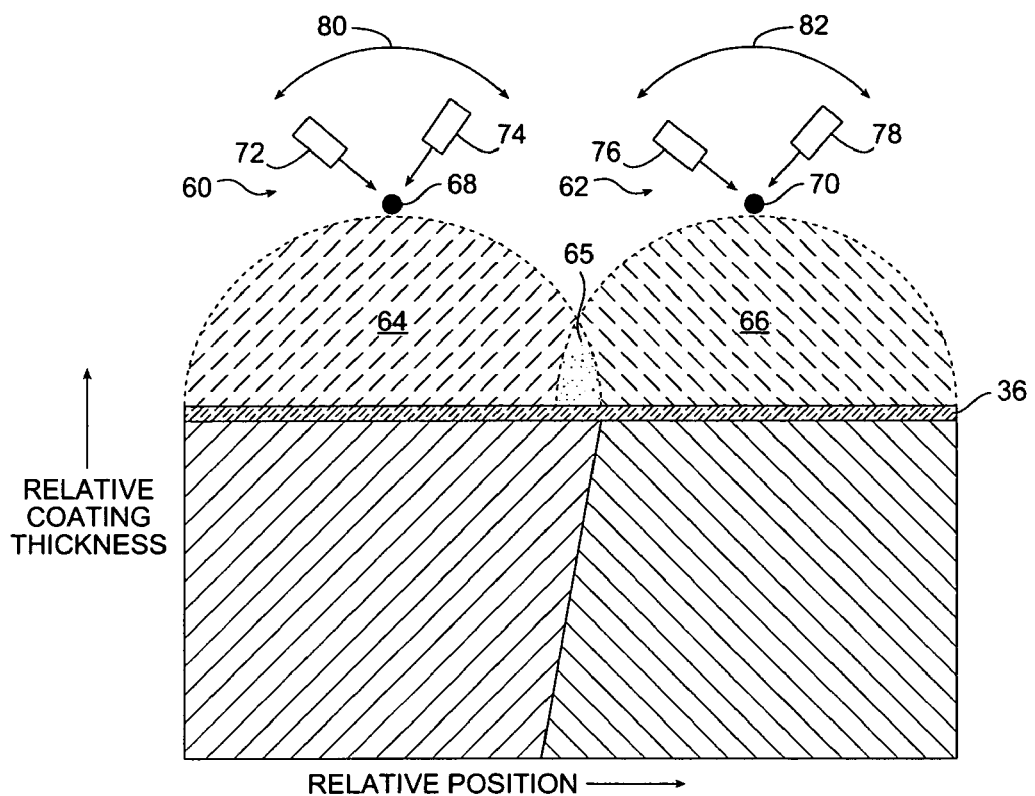
Figure 6B:
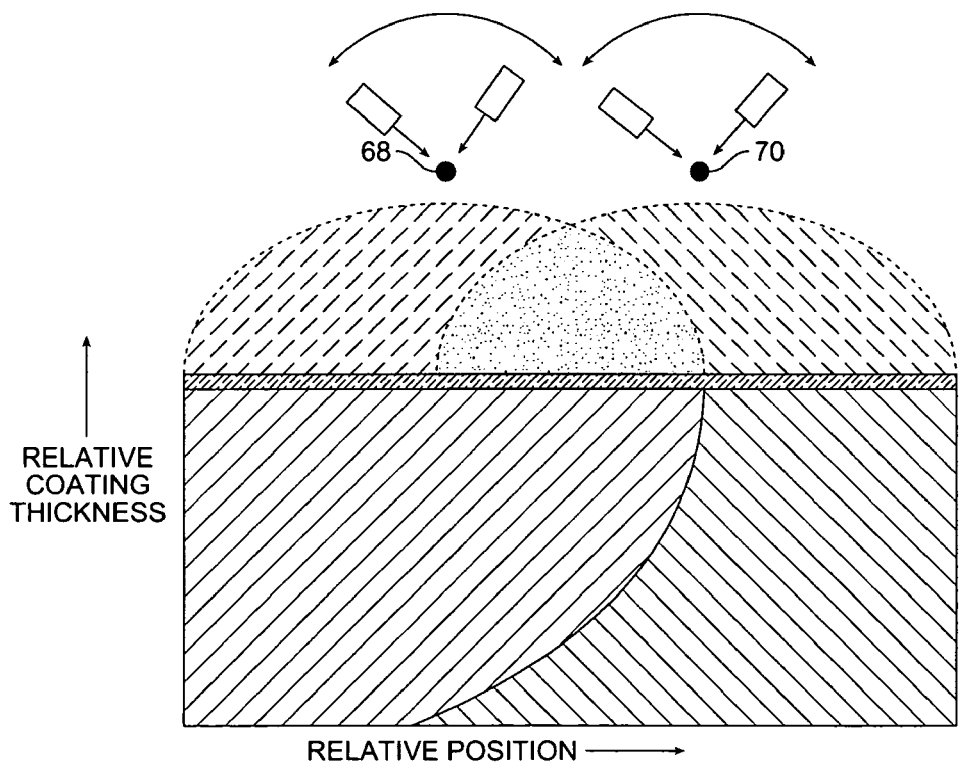
Figure 6C:
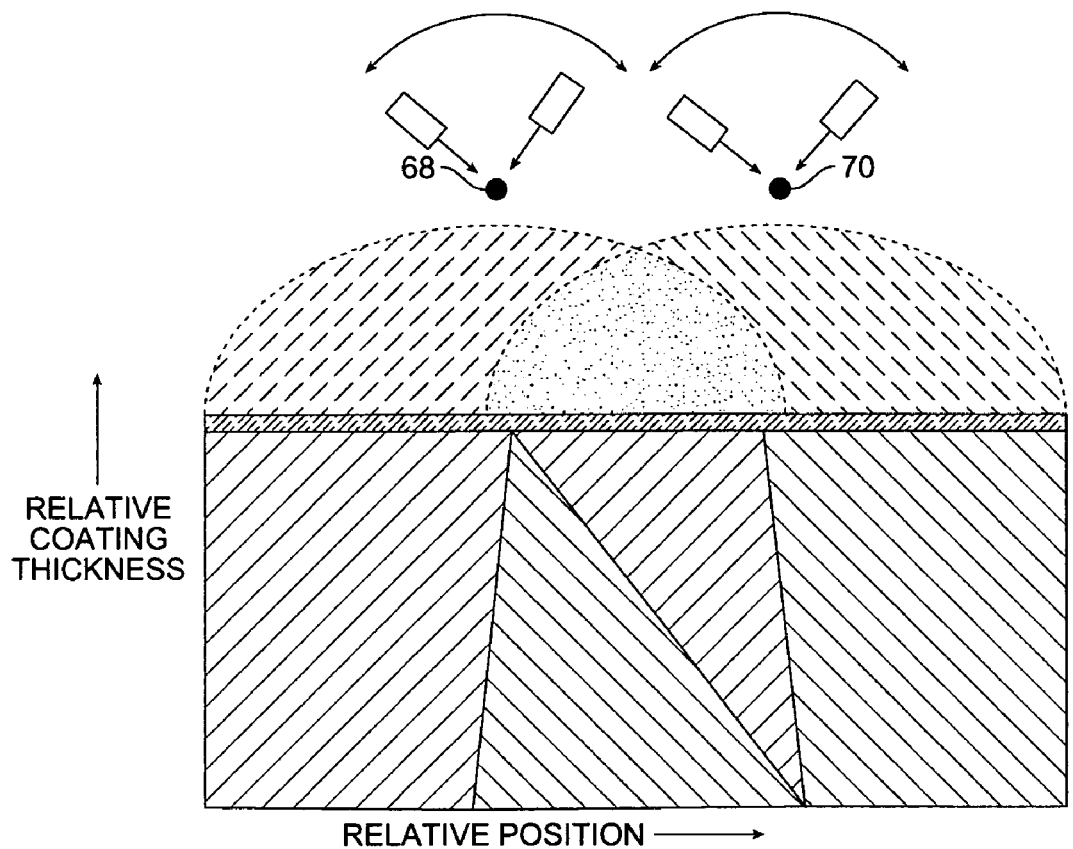

FIGS. 6A–6C show relative coating thickness versus position on a substrate for different spray head configurations. Referring to FIG. 6A, adjacent spray heads 60, 62 each form nebulized aerosols 64, 66 represented by the half-oval curves which are merely provided for purposes of convenient illustration and do not necessarily represent the actual shape of the nebulized aerosols. Ultrasonic nozzles 68, 70 (viewed head-on) create small droplets of a liquid spray medium (nebulized aerosols), which are directed toward the substrate 36 by air jets 72, 74, 76, 78. A spray head may have a single air jet or multiple air jets.

The spray heads 60, 62 oscillate, as indicated by double-ended arrows 80, 82 about an axis perpendicular to the plane of the figure. In a particular embodiment the spray heads are synchronized and oscillate in unison. The spray heads do not have to be at the same level above the substrate 36. The air jets are fixed in relation to each other and the nozzle, or alternatively adjustable in relation to each other and the nozzle. An overlap region 65 combining both nebulized aerosol sprays 64, 66 results in the approximate middle of the substrate. An air curtain (see FIG. 6D, ref. num. 90) directs the nebulized aerosols to the surface of the substrate and the resulting coating is a combination of material(s) from the adjacent nozzles.

FIG. 6A shows the relative (i.e. normalized) coating thickness indicating the coating material thickness (shown in a first hatching) deposited from the first nozzle 68 and coating material thickness (shown in a second hatching) from the second nozzle 70 when the nebulized aerosols 64, 66 have a small overlap 65 and wherein a nozzle's contribution to the coating thickness on the substrate 36 at any point between the nozzles is $N_1=N_2$, and at any point between the nozzles point coating thickness ("PCT") is $N_1+N_2$. FIG. 6B shows the relative coating material thickness from the first nozzle 68 and coating material thickness from the second nozzle 70 for the case where a nozzle's contribution to the coating material on the substrate at any point between the nozzles is $N_1>N_2$, and at any point between the nozzles PCT=$N_1+N_2$. FIG. 6C shows the relative coating material thickness from the first nozzle 68 and the coating material thickness from the second nozzle 70 for the case wherein a nozzle's contribution to the coating material on the substrate at any point between the nozzles can range between $N_1 \geq N_2$ to $N_1 \leq N_2$ and at any point between the nozzles PCT=$N_1+N_2$.

Figure 6D:
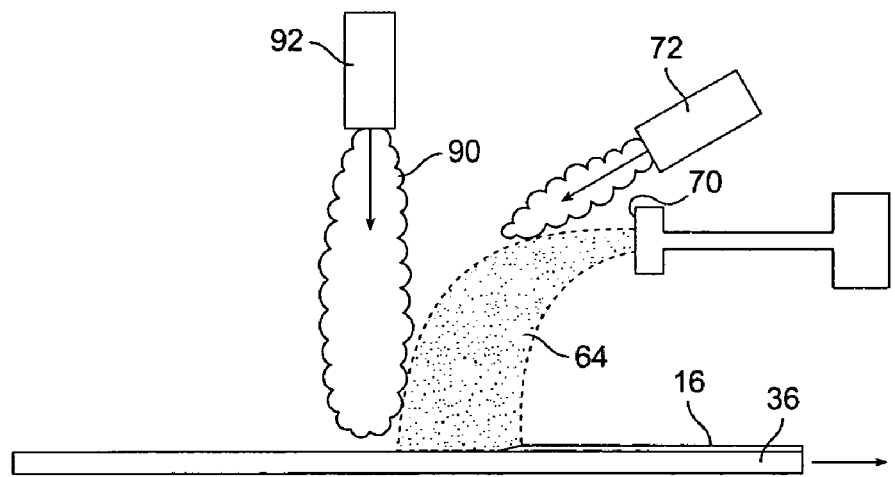

FIG. 6D is a simplified side view of a portion of the spray-coating apparatus shown in FIGS. 6A–6C. An air curtain 90 (represented by a clear "cloud") directs the nebulized aerosol 64 from the nozzle 68 and air jets 72 toward the substrate 36. The air curtain 90 is basically a sheet of air or other gas provided by an air curtain source 92, which typically has a row of nozzles or a slot from which air is directed toward the substrate, foreshortening the nebulized aerosol 64. In a further embodiment, the air from the air curtain is heated to promote drying of droplets in the nebulized aerosol(s) that contact the heated air curtain, thus forming high-viscosity droplets at the air curtain interface for incorporation into an antireflective polymer layer 16 on the substrate 36.

When the nebulized cloud approaches the surface, it comprises a heterogeneous dispersion of polymer solution particles of high and low viscosity and a mean size distribution different from that leaving the nebulizer. The smaller, higher viscosity particles are typically blown further away from the nozzles to land on the coating surface, remaining near the surface. The same size (i.e. small) droplets may become buried down in the coating, providing less antireflective effect, if they were to have been deposited on the substrate closer to the nozzle.

Figure 7A:
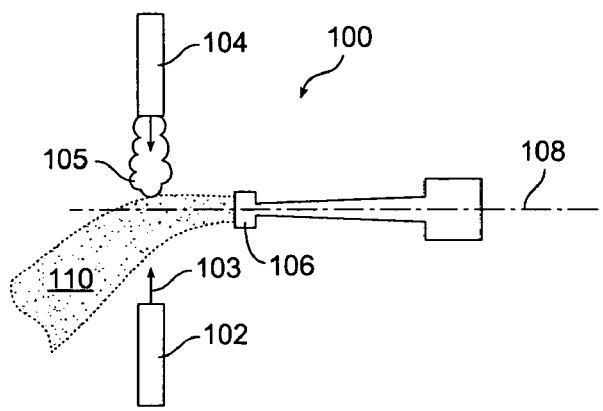
Figure 7B:
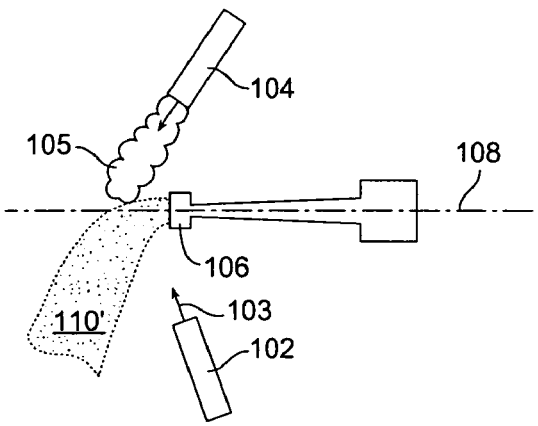

FIGS. 7A and 7B are simplified top-view diagrams of a spray head 100 according to an embodiment of the present invention. In FIG. 7A, air jets 102, 104 are positioned in front of an ultrasonic nozzle 106, with both air jets 102, 104 being essentially perpendicular to a centerline 108 of the ultrasonic nozzle 106. A nebulized aerosol 110' ejected from the ultrasonic nozzle 106 is pushed by air 103 from the first air jet 102 toward the second air jet 104, which uses an air plume 105 to redirect the nebulized aerosol 110' toward the substrate (not shown) and an air curtain (not shown). In this example, the second air jet 104 has a weaker air flow, and is thus represented by a simple arrow rather than an air plume. In some embodiments, the relative air flows of the air jets are varied to sweep the nebulized aerosol across the substrate. What is desired is that a uniform amount (thickness) of material is delivered to the surface of the substrate. There are many ways to achieve this result. For example, the pressures in the air jets could be varied, such as by turning the air jets on or off, or the nozzle(s) location(s) could be swept (see, e.g. FIG. 7B). Generally, one will obtain about the same volume of material deposited on each side of the centerline 108 of nozzle 106 if the first air jet 102 has more pressure than the second air jet 104, but the coating thickness on the side of the substrate that the first air jet 102 is directed at would be thinner, i.e. less material per unit area. There are many ways to control the coating parameters to obtain the desired coating thickness.

FIG. 7B shows air jets 102, 104 positioned behind the ultrasonic nozzle 106, with both air jets 102, 104 being oblique with respect to an axis 108 of the ultrasonic nozzle 106. The first air jet 102 is angled to essentially blow the nebulized aerosol 110 ejected from the ultrasonic nozzle 106 toward the second air jet 104, which redirects the nebulized aerosol 110' toward the substrate (not shown) and air curtain (not shown) with its air plume 105. FIGS. 7A and 7B illustrate that both the position of the air jets relative to the nebulized aerosol and the how air is applied to the nebulized aerosol (e.g. the frequency and/or shape of the waveform controlling the air flow out of the air jets) can be used to obtain a coating with uniform thickness.

Figure 8A:
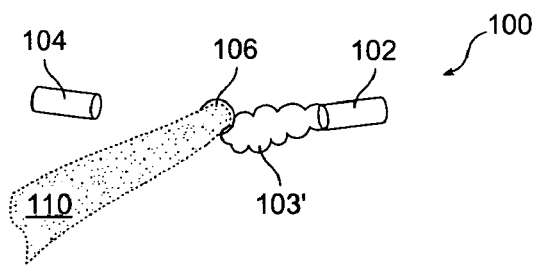
Figure 8B:
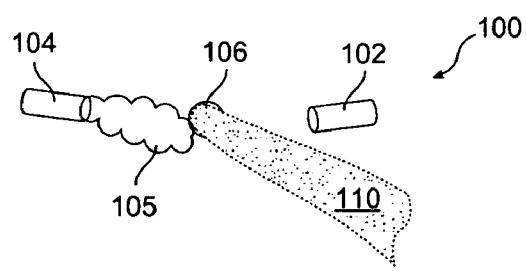
Figure 8C:
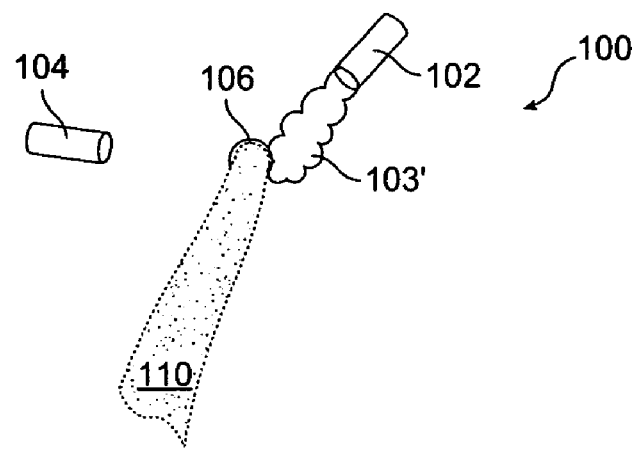
Figure 8D:
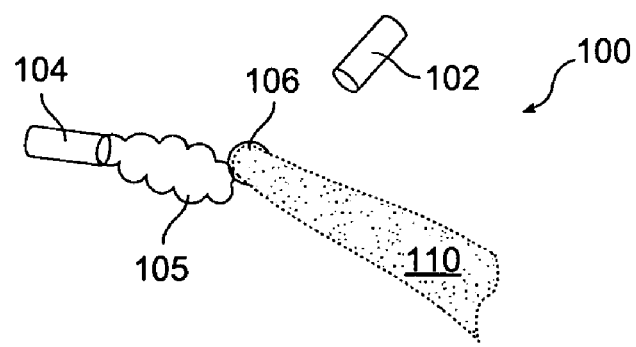

FIGS. 8A–8D are simplified front views of the spray head 100. In FIG. 8A, opposing air jets 102, 104 of the spray head 100 are positioned at identical angles above a plane that runs horizontally through the center of the nebulized aerosol 100, illustrating how the first air jet 102 diverts the nebulized aerosol 110 from the nozzle 106 with an air plume 103'. FIG. 8B shows the spray head 100 of FIG. 8A with the second air jet 104 diverting the nebulized aerosol 110 from the nozzle 106 with an air plume 105. FIG. 8C shows air jets 102, 104 on the spray head 100 positioned at different angles above a plane that runs horizontally through the center of nozzle 106, showing how the first air jet 102 diverts the nebulized aerosol 110 with the air plume 103'. FIG. 8D shows the spray head 100 of FIG. 8C and how the second air jet 104 diverts the nebulized aerosol 110 from the nozzle 106 with the air plume 105.

Figure 9:
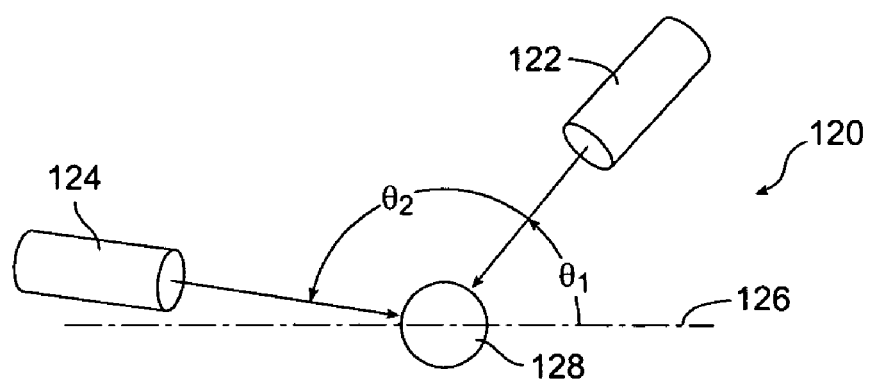

FIG. 9 is a simplified front view of a spray head 120 with air jets 122, 124 positioned at different angles $Theta_1$, $Theta_2$ from a plane 126 that runs horizontally through the center of a nozzle 128, which in this case is also the center of the nebulized aerosol being ejected from the nozzle (not shown). FIG. 9 shows that one can adjust the air-nebulized aerosol impingement angle in three axes.

IV. Exemplary Methods

FIG. 10A is a simplified flow chart 150 of a method for forming an antireflective transmissive polymer coating on a substrate. In a particular embodiment using a water-based polyurethane precursor containing a dye for absorbing 585 nm light, the initial viscosity of the spray media was about 100 cps. The concentration of solids in the precursor was about 1–2%, which is merely exemplary. The resulting polymer coating has a transmissivity of 30% at 585 nm with a variation of less than +1.5% across the greatest dimension of the substrate. Generally, polyurethane containing high boiling alcohols as co-solvent(s) work better with glass than those containing N-Methyl Pyrollidinone (NMP) as a co-solvent. Cyanine dyes are suitable due to their compatibility with water-based systems. Organo-metallic stabilizers are optionally added to prevent photo-bleaching of the dye.

The solubilized polymer solution was dispensed as an aerosol from an ultra-sonic nebulizer (step 152) operating at about 48 KHz to form droplets with a mean size estimated to be about 60 microns. The aerosol from the nebulizer was directed towards a flat glass panel (substrate) (step 154) approximately 61 cm by 102 cm (24 by 40 inches) that was moved along the axis of the nebulizer at a rate of about 0.008 m/s. Alternatively, the dye is omitted from the precursor in some embodiments, or other or additional dyes, such as an infrared dye, are added.

In other embodiments, the substrate is not flat, but is curved in one or more directions, and may be an object other than a glass panel. In yet another embodiment, the substrate includes ridges. In another embodiment, the substrate is about 117 cm by 60 cm (46 by 24 inches) and multiple spray heads are used. It is not required that the object move along the axis of the nebulizer, and the time the nebulizer(s) is on, the pressure of the liquid spray media, and other parameters are used to control desired characteristics of the resultant coating. Similarly, it is not required that a solubilized polymer solution be used. For example, a UV-curable or thermosetting polymer precursor is used with solid particles, such as small particles of the cured polymer or of other materials.

The ultra-sonic nebulizer was about 57 cm above the surface of the glass panel and produced a nebulized aerosol about 7.6 cm (3 inches) wide. Air jets were used to direct the nebulized aerosol toward the moving surface of the substrate, and oscillated to provide a uniform coating across the glass panel as it moved along. In a further embodiment, the air jets associated with an ultra-sonic nebulizer are oscillated in unison. In a yet further embodiment, a spray coating apparatus has more than one nebulizer and associated air jets, and the air jets of adjacent nebulizers are synchronized to avoid the aerosol from one nebulizer substantially blowing into the aerosol of the adjacent nebulizer.

An optional air curtain approximately 10–30 cm from the output of the ultra-sonic nebulizer foreshortened the nebulized aerosol, directing the leading edge of the aerosol toward the surface of the glass panel and removing additional solvent (i.e. water) from droplets proximate to the air curtain relative to droplets distal from the air curtain. The gas dispensed by the air curtain is optionally heated to control humidity or humidity in the air curtain is otherwise controlled, such as by providing dried air or nitrogen, to obtain the desired solvent extraction from the droplets.

The solubilized polymer solution is dried (step 156) to form a dyed transmissive polymer coating (step 158) about 10–60 microns thick, although this thickness is merely exemplary. In a particular embodiment, the thickness of the dyed transmissive polymer coating is between about 40–50 microns thick, which is particularly desirable for obtaining good absorption of 585 nm light at a dye concentration that does not phase separate, and provides adequate shard retention if a glass substrate shatters. The transmissivity variation across the substrate was less than ±1.33% for the dyed polymer coating, which related to a total thickness variation of about 1.7%. A particular advantage of this technique is that, within reason, the resulting polymer coating may be made arbitrarily thick to obtain the desired absorption and safety characteristics.

For example, it is desirable that the dye be sufficiently dilute so that it does not separate from the polymer as a separate phase during drying or curing. In such a situation, the concentration of dye is reduced in the precursor and a thicker layer of dyed polymer coating is applied to obtain the desired color-balancing and/or contrast enhancement of the resultant dyed polymer coating. Alternatively, dye is optionally omitted, and the thickness of the polymer coating is chosen to provide a safety feature in case the glass substrate breaks. Generally, a thicker polymer coating provides a higher degree of safety, up to a point, and the dye concentration in such thicker layers is reduced to obtain the desired absorption of light at the film thickness. If a high degree of safety is not needed from the polymer coating, such as when a separate safety film is applied to the glass panel, a thinner polymer coating is formed to obtain an antireflective surface and more dye is added to the polymer solution to obtain the desired absorption of light.

FIG. 10B is a flow chart of a method 160 using two nebulized aerosols according to another embodiment of the present invention. A first nebulized aerosol from a first solubilized polymer solution is formed (step 162). The first nebulized aerosol is directed toward a surface of an object to form an essentially continuous polymer film on the surface of the object (step 164). A second nebulized aerosol is formed from a second solubilized polymer solution (step 166), which may be the same as or different from the first solubilized polymer solution. The second nebulized aerosol is directed toward the continuous polymer film (step 168). The particles in the second nebulized aerosol have viscosity selected to adhere to the continuous polymer film and at least partially extend above the continuous polymer film to form a textured polymer film. The textured polymer film is dried (step 170) to form the transmissive polymer coating with a textured antireflective surface.

In a particular embodiment, a surface of the continuous polymer film has viscosity between about 25,000 cps and about 150,000 cps and particles in the second nebulized aerosol have viscosity greater than about 5,000 cps. The mean size distribution in the second nebulized aerosol is between about 40 nm and about 600 nm. This size of particle forms a surface with suitable antireflective properties without unduly scattering light, which can occur with larger particles. Smaller particles may not extend sufficiently above the surface of the coating to provide enough antireflective effect. The continuous polymer film has a coated film thickness of between about 10 microns and 50 microns, and the final transmissive polymer coating has a coating thickness between about 40 nm to about 300 nm greater than the coated film thickness.

While the invention has been described above with respect to specific embodiments, various modifications and substitutions may become apparent to one of skill in the art without departing from the present invention. For example, it may be desirable to use different dyes in different polymer systems, or to use polymers solubilized in organic solvents. Similarly, it may be desirable to form anti-reflective polymer coatings on opaque objects. Therefore, the invention should not be limited by the examples of embodiments given above, but by the following claims.

What is claimed is:

1. A method of applying a transmissive polymer coating having a textured antireflective surface comprising:
   forming a nebulized aerosol from a solubilized polymer solution;
   directing the nebulized aerosol toward a surface of an object to wet the surface; and
   drying the solubilized polymer solution to form the transmissive polymer coating having the textured antireflective surface, wherein the nebulized aerosol includes low-viscosity droplets of the solubilized polymer solution and high-viscosity droplets of the solubilized polymer solution, and, after the drying step, at least a portion of the high-viscosity droplets extending above an essentially continuous polymer film of the transmissive polymer coating to form the textured antireflective surface.

2. The method of claim 1 wherein the step of directing includes providing an air jet to direct the nebulized aerosol toward the surface.

3. The method of claim 2 wherein the directing step further includes heating the air jet.

4. The method of claim 1 further comprising steps of moving the surface along a first direction; and
   oscillating the air jet to distribute the nebulized aerosol transverse to the first direction.

5. The method of claim 4 wherein the step of directing includes providing a second air jet, and the step of oscillating includes synchronizing the second air jet with the air jet.

6. The method of claim 1 further comprising a step, prior to forming the nebulized aerosol, of mixing a dye with the solubilized polymer solution in a concentration chosen to avoid phase separation of the dye from both the high-viscosity droplets and the essentially continuous polymer film.

7. The method of claim 6 wherein a thickness of the essentially continuous polymer film and the concentration of the dye are chosen to provide a selected absorption of light.

8. A method of applying a transmissive polymer coating having a textured antireflective surface comprising:
   forming a nebulized aerosol from a solubilized polymer solution; directing the nebulized aerosol toward a surface of an object to wet the surface; and
   drying the solubilized polymer solution to form the transmissive polymer coating having the textured antireflective surface, wherein the nebulized aerosol comprises, before the step of directing, a heterogeneous dispersion of polymer solution particles having a first mean size distribution, and before wetting the surface, the nebulized aerosol comprises a heterogeneous dispersion of polymer solution particles having a second mean size distribution.

9. A method of applying a transmissive polymer coating having a textured antireflective surface comprising:
   forming a first nebulized aerosol from a first solubilized polymer solution;
   directing the first nebulized aerosol toward a surface of an object to form a continuous polymer film;
   forming a second nebulized aerosol from a second solubilized polymer solution;
   directing the second nebulized aerosol toward the continuous polymer film particles in the second nebulized aerosol having viscosity selected to adhere to the continuous polymer film and at least partially extend above the continuous polymer film to form a textured polymer film; and
   drying the textured polymer film to form the transmissive polymer coating having the textured antireflective surface, wherein a surface of the continuous polymer film has viscosity between about 25,000 cps and about 150,000 cps and particles in the second nebulized aerosol having viscosity greater than about 5,000 cps.

* * * * *